United States Patent
Pan et al.

(10) Patent No.: US 11,444,480 B2
(45) Date of Patent: Sep. 13, 2022

(54) WIRELESS CHARGING SYSTEM, WIRELESS CHARGING DEVICE AND WIRELESS POWER RECEIVING DEVICE

(71) Applicant: Beijing Xiaomi Mobile Software Co., Ltd., Beijing (CN)

(72) Inventors: Yajun Pan, Beijing (CN); Shujun Wei, Beijing (CN); Jian Bai, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 347 days.

(21) Appl. No.: 16/670,096

(22) Filed: Oct. 31, 2019

(65) Prior Publication Data

US 2020/0335999 A1 Oct. 22, 2020

(30) Foreign Application Priority Data

Apr. 22, 2019 (CN) .......................... 201910325192.6

(51) Int. Cl.
*H02J 50/20* (2016.01)
*H02J 7/02* (2016.01)
(Continued)

(52) U.S. Cl.
CPC ............... *H02J 7/025* (2013.01); *G06F 3/14* (2013.01); *H02J 50/20* (2016.02); *H02J 50/80* (2016.02);
(Continued)

(58) Field of Classification Search
USPC ........................................................ 320/108
See application file for complete search history.

(56) References Cited

U.S. PATENT DOCUMENTS

2011/0050164 A1* 3/2011 Partovi .................. H02J 50/10
320/108
2016/0141908 A1 5/2016 Jakl et al.
(Continued)

FOREIGN PATENT DOCUMENTS

CN 205407343 U 7/2016
CN 107070478 A 8/2017
(Continued)

OTHER PUBLICATIONS

Extended European Search Report for Application No. 19217033.0-1220, dated Apr. 1, 2020.
(Continued)

*Primary Examiner* — Bryce M Aisaka
(74) *Attorney, Agent, or Firm* — Finnegan, Henderson, Farabow, Garrett & Dunner, L.L.P.

(57) ABSTRACT

Embodiments of the present disclosure provide a wireless charging system, a wireless charging device, and a wireless power receiving device, and relate to the field of wireless charging. The system includes a wireless charging device and a wireless power receiving device. The wireless charging device includes a wireless charging module, a first function module, and a first communication module, and the wireless charging module includes a radio frequency transmitting antenna; the wireless power receiving device includes a wireless power receiving module, a second function module and a second communication module; the wireless charging module is configured to supply power to the wireless power receiving device through the radio frequency transmitting antenna; and the first function module and the second function module communicate with each other through the first communication module and the second communication module.

20 Claims, 10 Drawing Sheets

(51) Int. Cl.
  *H02J 50/80* (2016.01)
  *G06F 3/14* (2006.01)
  *G06F 3/041* (2006.01)
  *H04N 5/232* (2006.01)

(52) U.S. Cl.
  CPC .......... *G06F 3/041* (2013.01); *H04N 5/23203* (2013.01)

(56) References Cited

U.S. PATENT DOCUMENTS

| | | | |
|---|---|---|---|
| 2017/0237292 | A1 | 8/2017 | Jeong et al. |
| 2018/0048187 | A1 | 2/2018 | White et al. |
| 2018/0192266 | A1 | 7/2018 | Park et al. |
| 2018/0375368 | A1 | 12/2018 | Leabman et al. |

FOREIGN PATENT DOCUMENTS

| | | | |
|---|---|---|---|
| CN | 107949973 | A | 4/2018 |
| CN | 108270298 | A | 7/2018 |
| CN | 108599397 | A | 9/2018 |
| CN | 109378908 | A | 2/2019 |
| CN | 208581078 | U | 3/2019 |
| EP | 3 582 466 | A1 | 12/2019 |
| JP | 2008167373 | A | 7/2008 |
| JP | 2018527864 | A | 9/2018 |
| KR | 20130029178 | A | 3/2013 |
| KR | 20170006859 | A | 1/2017 |
| KR | 20170100649 | A | 9/2017 |
| KR | 20180090893 | A | 8/2018 |
| RU | 2306653 | C1 | 9/2007 |
| RU | 2510558 | C1 | 3/2014 |
| WO | WO 2019/039898 | A1 | 2/2019 |

OTHER PUBLICATIONS

First Office Action of Russian Application No. 2019141194/07 dated Jul. 31, 2020.
International Search Report of PCT Application No. PCT/CN2019/098664, dated Jan. 22, 2020.
English version of International Search Report in Application No. PCT/CN2019/098664, from the China National Intellectual Property Administration (ISA/CN), dated Jan. 22, 2020.
First Office Action of Korean Application No. 10-2019-7028469 dated Nov. 27, 2020.
Notice of Reasons for Refusal of Japanese Application No. 2019-554963 dated Aug. 24, 2021.
Notification of Reason for Refusal of Korean Application No. 10-2019-7028469 dated Jul. 22, 2021.
Notification to Grant Patent Right for Invention dated Jan. 17, 2022, from the State Intellectual Property Office of People's Republic of China in counterpart Japanese Application No. 2019-10325192.6.
Notice of Allowance of Korean Application No. 10-2019-7028469, dated Apr. 8, 2022.

\* cited by examiner

WIRELESS CHARGING SYSTEM, WIRELESS CHARGING DEVICE AND WIRELESS POWER RECEIVING DEVICE

CROSS-REFERENCE TO RELATED APPLICATION

This application is based upon and claims priority to Chinese Patent Application No. 201910325192.6, filed on Apr. 22, 2019, the entire contents thereof are incorporated herein by reference.

TECHNICAL FIELD

The present disclosure relates to the field of wireless charging, and in particular, to a wireless charging system, a wireless charging device, and a wireless power receiving device.

BACKGROUND

Wireless charging is a technology applied to a charging process of various mobile terminals such as mobile phones, tablets, and notebooks.

In related art, the wireless charging technology includes a wireless charging device and a wireless power receiving device. The wireless charging device includes a charging coil, and the wireless power receiving device includes a power receiving coil and a battery.

However in the process of wireless charging, since the wireless charging process is implemented by electromagnetic induction, the distance between the wireless charging device and the wireless power receiving device needs to be kept within a small distance range. The flexibility of the wireless power receiving device is poor in a case where the flexibility of the wireless charging device is poor.

SUMMARY

Embodiments of the present disclosure provide a wireless charging system, a wireless charging device, and a wireless power receiving device.

According to a first aspect of the present disclosure, there is provided a wireless charging system, including a wireless charging device and a wireless power receiving device. The wireless charging device includes a wireless charging module, a first function module, and a first communication module, and the wireless charging module includes a radio frequency transmitting antenna; the wireless power receiving device includes a wireless power receiving module, a second function module, and a second communication module, and the wireless power receiving module includes a radio frequency receiving antenna; the wireless charging module is configured to supply power to the wireless power receiving device through the radio frequency transmitting antenna, and the wireless power receiving module is configured to receive the power supplied by the wireless charging device through the radio frequency receiving antenna; the first function module is configured to implement a first function subset in a function set, and the second function module is configured to implement a second function subset in the function set; and the first function module and the second function module communicate with each other through the first communication module and the second communication module.

According to another aspect of the present disclosure, there is provided a wireless charging device, including a wireless charging module, a first function module, and a first communication module. The wireless charging module includes a radio frequency transmitting antenna; the wireless charging module is configured to supply power to a wireless power receiving device through the radio frequency transmitting antenna; the first function module is configured to implement a first function subset in a function set; and the first function module is configured to communicate with a second function module in the wireless power receiving devices through the first communication module.

According to another aspect of the present disclosure, there is provided a wireless power receiving device, including a wireless power receiving module, a second function module, and a second communication module. The wireless power receiving module includes a radio frequency receiving antenna; the wireless power receiving module is configured to receive power supplied by a wireless charging device through the radio frequency receiving antenna; the second function module is configured to implement a second function subset in a function set; and the second function module is configured to communicate with a first communication module of a wireless charging device through the second communication module.

The technical solutions provided by the present disclosure have the following beneficial effects.

By disposing the wireless charging module in the wireless charging device and the wireless power receiving module in the wireless power receiving device, and supplying power to the wireless power receiving module by the wireless charging module through the radio frequency transmitting antenna, a long-distance wireless charging between the wireless charging device and the wireless power receiving device is realized, so that the first function module of the wireless power receiving device is disposed in the wireless charging device, and an interaction between the first function module and the second function module is realized through the communication module, which improves the flexibility of the wireless power receiving device when being used.

BRIEF DESCRIPTION OF THE DRAWINGS

The accompanying drawings herein, which are incorporated into the description and constitute a part thereof, illustrate embodiments of the present disclosure and serve to explain the principle of the present disclosure.

DETAILED DESCRIPTION

Figure 1:
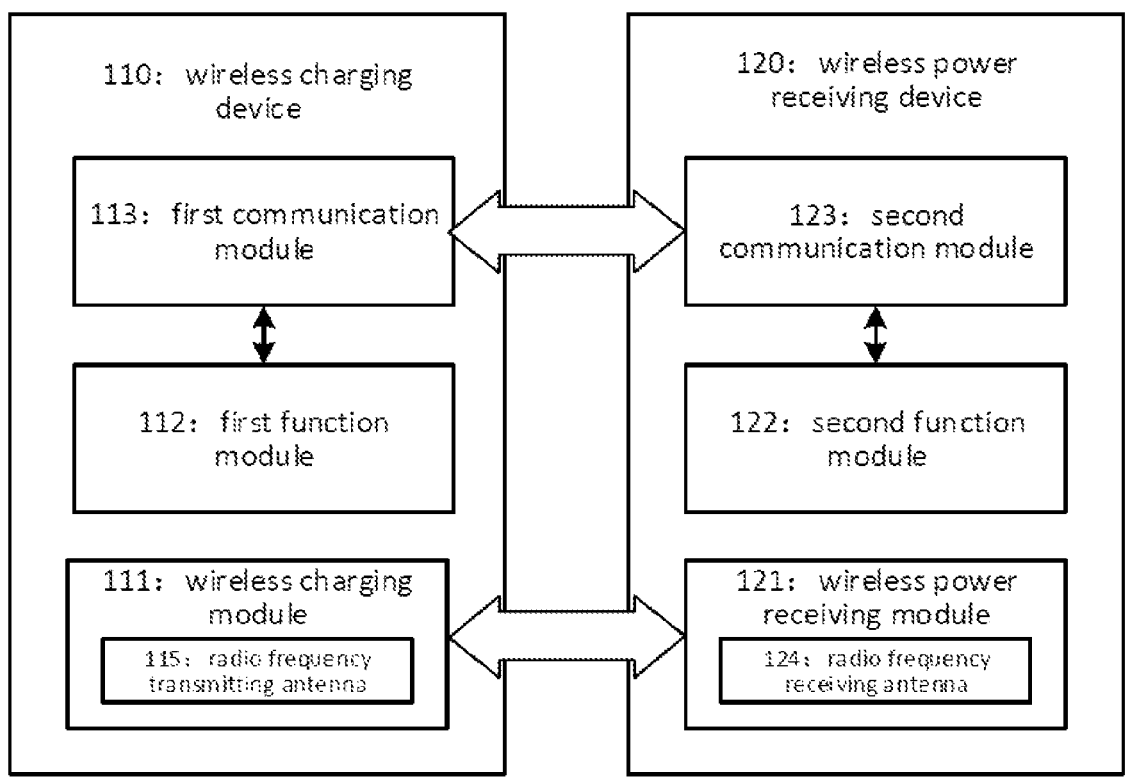
FIG. 1 is a block diagram of a wireless charging device and a wireless power receiving device in a wireless charging system according to an exemplary embodiment.

Exemplary embodiments will be described in detail herein, examples of which are illustrated in the accompanying drawings. In the following description of the accompanying drawings, the same or similar reference numerals in different figures denote the same or similar elements unless indicated otherwise. The implementations described in the following exemplary embodiments do not represent all the implementations of the present disclosure. Instead, they are merely examples of devices and methods according to aspects of the present disclosure as recited in detail in the appended claims.

FIG. 1 is a block diagram of a wireless charging system 100 according to an exemplary embodiment of the present disclosure. As shown in FIG. 1, the wireless charging system 100 includes a wireless charging device 110 and a wireless power receiving device 120.

The wireless charging device 110 includes a wireless charging module 111, a first function module 112, and a first communication module 113. The wireless power receiving device 120 includes a wireless power receiving module 121, a second function module 122, and a second communication module 123. The wireless charging module 111 includes a radio frequency transmitting antenna 115, and the wireless power receiving module 121 includes a radio frequency receiving antenna 124.

In an embodiment, as shown in FIG. 1, in the wireless charging device 110, the first function module 112 is coupled to the first communication module 113. In the wireless power receiving device 120, the second communication module 123 is coupled to the second function module 122.

In an embodiment, the wireless charging module 111 is configured to supply power to the wireless power receiving device 120 through a radio frequency transmitting antenna 115, and the wireless power receiving module 121 is configured to receive power supply of the wireless charging device 110 through a radio frequency receiving antenna 124.

In an embodiment, the radio frequency transmitting antenna 115 and the radio frequency receiving antenna 124 transmit radio frequency by radio frequency (RF) technology. For example, the radio frequency represents electromagnetic frequency radiated into space, and the radio frequency is radio frequency current, which is a kind of high frequency alternating current varying electromagnetic wave.

In an embodiment, after receiving the power supply of the wireless charging device 110 through the radio frequency receiving antenna 124, the wireless power receiving module 121 supplies the power to the wireless power receiving device 120. For example, the wireless power receiving module 121 supplies the power to the second function module 122 and the second communication module 123 of the wireless power receiving device 120 for operating.

In an embodiment, the wireless charging device 110 is connected to a power source, and the power source supplies power to the wireless charging device 110. The wireless charging device 110 supplies power of the power source to the wireless power receiving device 120 through the radio frequency transmitting antenna 115. In an embodiment, the wireless charging device 110 includes a battery, and the battery supplies power to the wireless charging device 110, and the wireless charging device 110 supplies power of the battery to the wireless power receiving device 120 through the radio frequency transmitting antenna 115.

In an embodiment, when the wireless charging device 110 includes a battery, and supplies the power of the battery to the wireless power receiving device 120, the wireless charging device 110 and the wireless power receiving device 120 can be used without a power source, that is, the wireless charging device 110 and the wireless power receiving device 120 can be implemented as a mobile terminal device group.

In an embodiment, the radio frequency power transmitted by the radio frequency transmitting antenna 115 of the wireless charging device 110 is adjusted according to a distance between the wireless charging device 110 and the wireless power receiving device 120. The wireless charging device 110 and the wireless power receiving device 120 may be attached together for charging, may be at a middle-field distance (e.g., 0.8 m) for wireless charging, and may be at a far-field distance (e.g., 4 m) for wireless charging. The radio frequency power is high at the far-field distance, and is low at the middle-field distance.

The first function module 112 is configured to implement a first function subset in a function set, and the second function module 122 is configured to implement a second function subset in the function set. In an embodiment, the first function subset and the second function may have intersection function items, or may be independent from each other. That is, the function implemented by the second function module may be completely different from the function implemented by the first function module; or the second function module may implement part of the function items in the first function module.

In an embodiment, the function set includes at least one of a sensor function, a display function, an image acquisition function, an audio play function, an audio acquisition function, a telephone communication function, or a network function.

In an embodiment, the sensor function is implemented by a sensor unit, which includes at least one of a gravity sensor, a temperature sensor, a light sensor, a distance sensor, or an acceleration sensor. The sensor in the sensor unit may be implemented in the first function module 112, may be implemented in the second function module 122, or may be implemented with one part in the first function module 112 and with the other part in the second function module 122.

In an embodiment, the display function may be implemented by the first function module 112, may be implemented by the second function module 122, or may be implemented by both of the first function module 112 and the second function module. In conjunction with the implementation of the display function, when the display function is implemented by a display screen, the first function module 112 includes a first display screen, and/or the second function module 122 includes a second display screen.

In an embodiment, the image acquisition function is implemented by an image acquisition unit (e.g., a camera). The camera may be configured in the wireless charging device 110, that is, the first function module 112 includes the camera. The camera may also be configured in the wireless power receiving device 120, that is, the second function module 122 includes the camera. It may be also that, the first function module 112 is configured with a first camera, and the second function module 122 is configured with a second camera. The embodiments of the present disclosure are not limited thereto. It shall be noted that the above camera may be implemented as a single camera component or as a group of camera components.

In an embodiment, the telephone communication function is implemented by the telephone communication unit in the first function module 112. When the second function module 122 includes a display screen and the wireless charging system 100 receives a call, the display screen of the wireless power receiving device 120 displays a call reminder, and after a user confirms answering the call, the second communication module 123 sends an answer signal to the first communication module 113, and the telephone communication unit receives telephone signal according to the answer signal, and starts voice acquisition function of the voice acquisition unit.

In an embodiment, the first function module 112 and the second function module 122 communicate with each other through the first communication module 113 and the second communication module 123.

In an embodiment, the wireless charging system 100 further includes a processor, which is configured to implement a calculating function. The processor may be implemented in the wireless charging device 110 or the wireless power receiving device 120. In an embodiment, the wireless charging device 110 may be configured with a first processor, and the wireless power receiving device 120 may be configured with a second processor.

In an embodiment, when the processor is configured in the wireless charging device 110, the function of the first function module 112 may be implemented by a trigger signal of the processor, and the function of the second function module 122 may be implemented according to the trigger signal received by the second communication module 123 after the trigger signal generated by the processor is sent to the second communication module 123 by the first communication module 113. In an embodiment, when the processor is configured in the wireless power receiving device 120, the function of the first function module 112 may be implemented according to a trigger signal received by the first communication module 113 after the trigger signal is generated by the processor and then sent to the first communication module 113 by the second communication module 123, and the function of the second function module 122 may be implemented by the trigger signal generated by the processor. In an embodiment, when the wireless charging device 110 is configured with the first processor and the wireless power receiving device 120 is configured with the second processor, the function of the first function module 112 is implemented by a trigger signal generated or received by the first processor, and the function of the second function module 122 is implemented by a trigger signal generated or received by the second processor. When there is a function interaction between the first and second function modules 112 and 122, an interaction communication is implemented by the first and second communication modules 113 and 123 after an interaction signal is generated by the processor.

Figure 2:
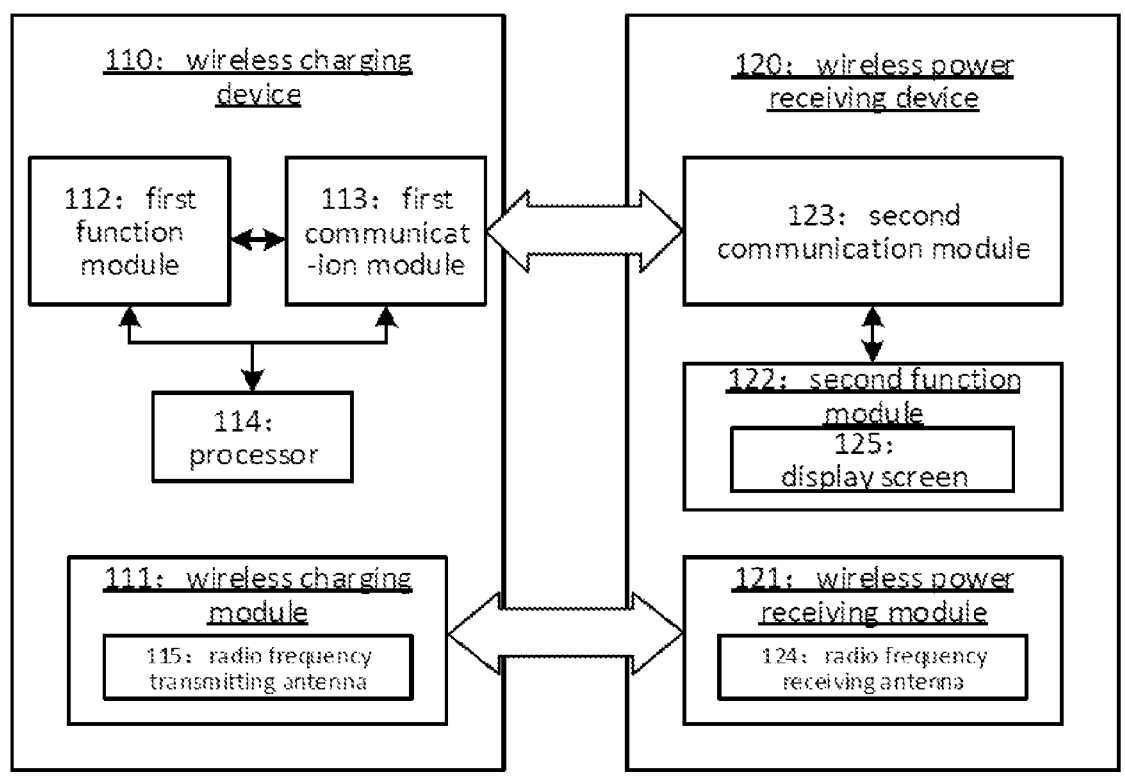
FIG. 2 is a block diagram of a wireless charging device and a wireless power receiving device in a wireless charging system according to an exemplary embodiment.

In an embodiment, referring to FIG. 2, the wireless charging device 110 includes a processor 114, and the second function module 122 includes a display screen 125 for implementing the above display function.

In an embodiment, the first function module 112 is configured to receive a trigger signal sent by the processor 114, and execute an operation corresponding to the trigger signal.

In an embodiment, the processor 114 is further configured to send a display signal to the second communication module 123 through the first communication module 113. The display screen 125 is further configured to display a corresponding content according to the display signal received by the second communication module 123.

In an embodiment, the wireless power receiving device 120 includes only the wireless power receiving module 121, the display screen 125, and the second communication module 123.

In an embodiment, the trigger signal sent by the processor 114 and received by the first function module 112 may be a trigger signal generated by the processor 114 according to a trigger operation received by the wireless power receiving device 120, and may also be a trigger signal generated by the processor 114 according to a notification message received by the wireless charging device 110.

In an embodiment, the display screen 125 in the wireless power receiving device 120 is a touch display screen including a touch function, and the display screen 125 is configured to receive a touch signal, and is further configured to send the touch signal to the first communication module 113 through the second communication module 123. The processor 114 in the wireless charging device 110 is configured to generate a trigger signal according to the touch signal received by the first communication module 113, and send the trigger signal to the first function module 112.

Figure 3:
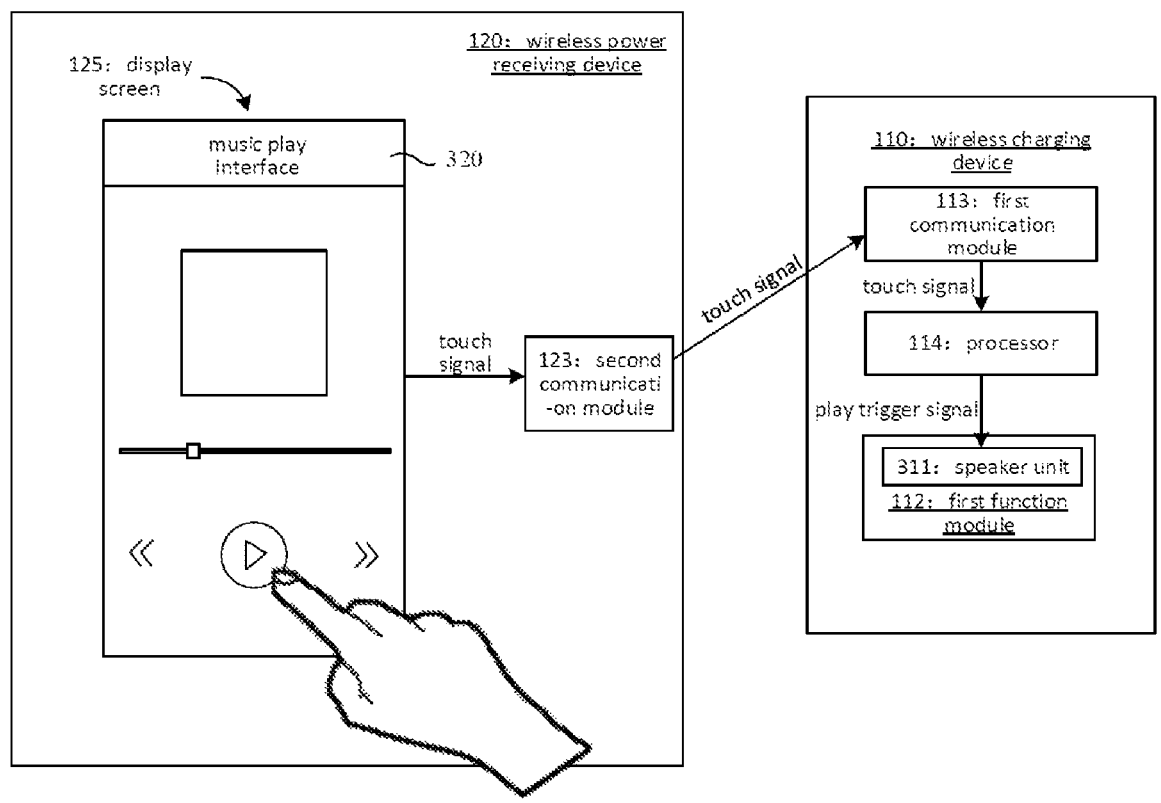
FIG. 3 is a diagram showing an interaction process of controlling a first function module by a display screen in a wireless power receiving device according to an exemplary embodiment.

In an embodiment, referring to FIG. 3, the first function module 112 includes a speaker unit 311. The display screen 125 displays a music play interface 320. After receiving the touch signal, the display screen 125 transmits the touch signal to the first communication module 113 through the second communication module 123. The touch signal includes a touch coordinate of a user on the display screen 125, and the processor 114 acquires the touch signal received by the first communication module 113, and determines that the control corresponding to the touch signal is a play control 321 according to the touch coordinate corresponding to the touch signal. The processor 114 generates a play trigger signal according to the touch signal, and sends the play trigger signal to the speaker unit 311 for music play.

In an embodiment, the wireless power receiving device 120 includes a physical button. When an operation signal from the physical button is received, the second communication module 123 sends the operation signal to the first communication module 113. The processor 114 in the wireless charging device 110 is configured to generate a trigger signal according to the operation signal received by the first communication module 113, and send the trigger signal to the first function module 112.

Figure 4:
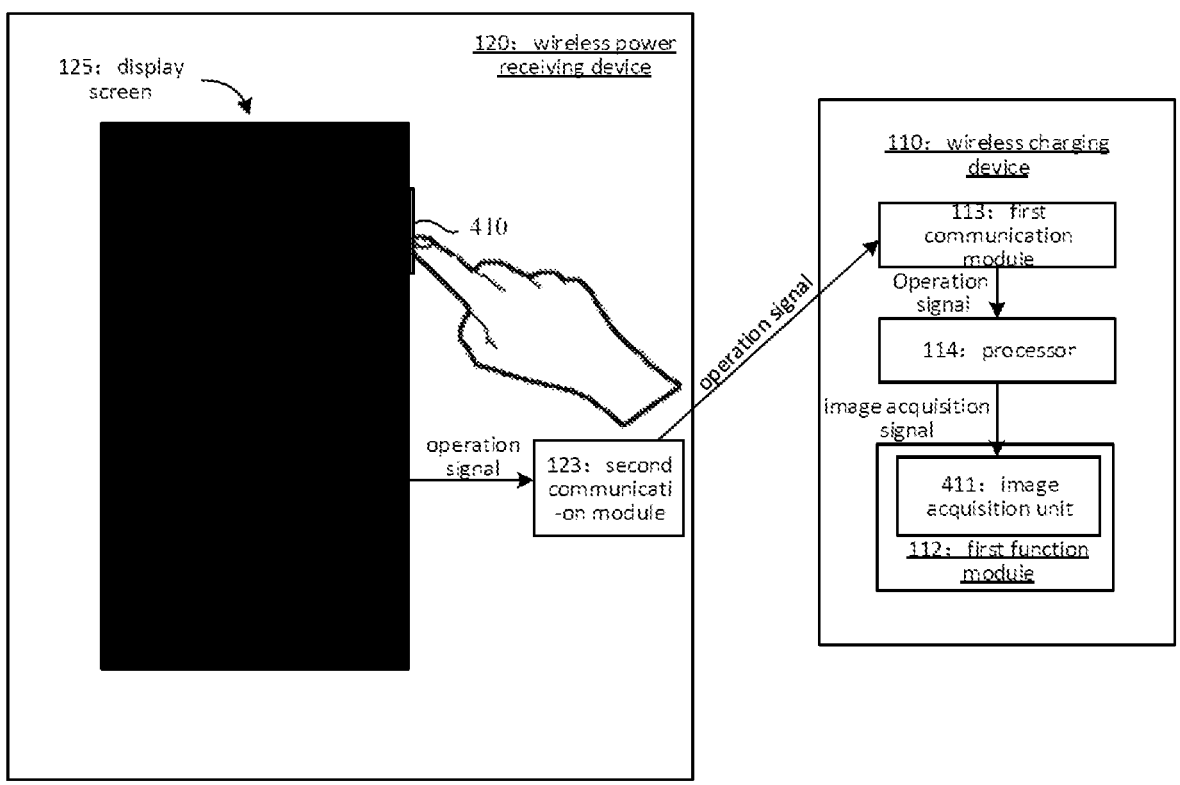
FIG. 4 is a diagram showing an interaction process of controlling a first function module by a physical button on a wireless power receiving device according to an exemplary embodiment.

For example, referring to FIG. 4, the first function module 112 includes an image acquisition unit 411, and the wireless power receiving device 120 includes a screen-lock button 410. When the wireless power receiving device 120 is in a screen-lock state, and receives an operation signal on the screen-lock button 410, the operation signal is sent to the first communication module 113 through the second communication module 123. The processor 114 generates an image acquisition signal according to the operation signal received by the first communication module 113, and sends the image acquisition signal to the image acquisition unit 411 for image acquisition. In an embodiment, the image acquired by the image acquisition unit 411 is used for facial recognition to unlock an application of the wireless power receiving device 120, that is, to unlock a module that implements the function of the wireless power receiving device in the wireless charging device.

In this embodiment, the physical button is in the wireless power receiving device 120. In another embodiment, the physical button may also be in the wireless charging device 110, which directly generates an operation signal in the wireless charging device 110 to control the operation of the first function module 112.

In an embodiment, the wireless charging device 110 includes a network communication module. When a notification message is received through the network communication module, the processor 114 generates a trigger signal according to the notification message, and sends the trigger signal to the first function module 112.

In an embodiment, the first function module 112 includes a speaker unit, and the wireless charging device 110 includes a network communication module. When the notification message is received through the network communication module, the processor 114 generates an audio prompt signal according to the notification message, and sends the audio prompt signal to the speaker unit for prompt sound playing.

In an embodiment, the wireless charging device 110 includes a timer, and performs timing according to the timer. When a timing moment is reached, the timer automatically generates a trigger signal, and sends the trigger signal to the processor 114, and the processor 114 sends the trigger signal to the first function module 112.

In an embodiment, the first function module 112 includes a speaker unit, and the wireless charging device 110 includes a timer. The timer is set with a first moment, and when the clock moment of the wireless charging device 110 reaches the first moment, the timer automatically generates a trigger signal and sends the trigger signal to the processor 114. The processor 114 sends the trigger signal to the speaker unit, and the speaker unit performs the prompt sound playing.

In an embodiment, the processor 114 is further configured to send a display signal to the second communication module 123 through the first communication module 113, and the display screen 125 is configured to display the corresponding content according to the display signal received by the second communication module.

In an embodiment, the display signal may be automatically generated in the wireless charging device 110, may be generated in the wireless charging device 110 according to the operation of the first function module 112, and may also be generated by the network communication module in the wireless charging device 110 according to the received notification message.

In an embodiment, the wireless charging device 110 includes a timer, and performs timing according to the timer. When a timing time is reached, a display signal is automatically generated by the timer, and the display signal is sent to the processor 114. The processor 114 transmits the display signal to the second communication module 123 through the first communication module 113.

Figure 5:
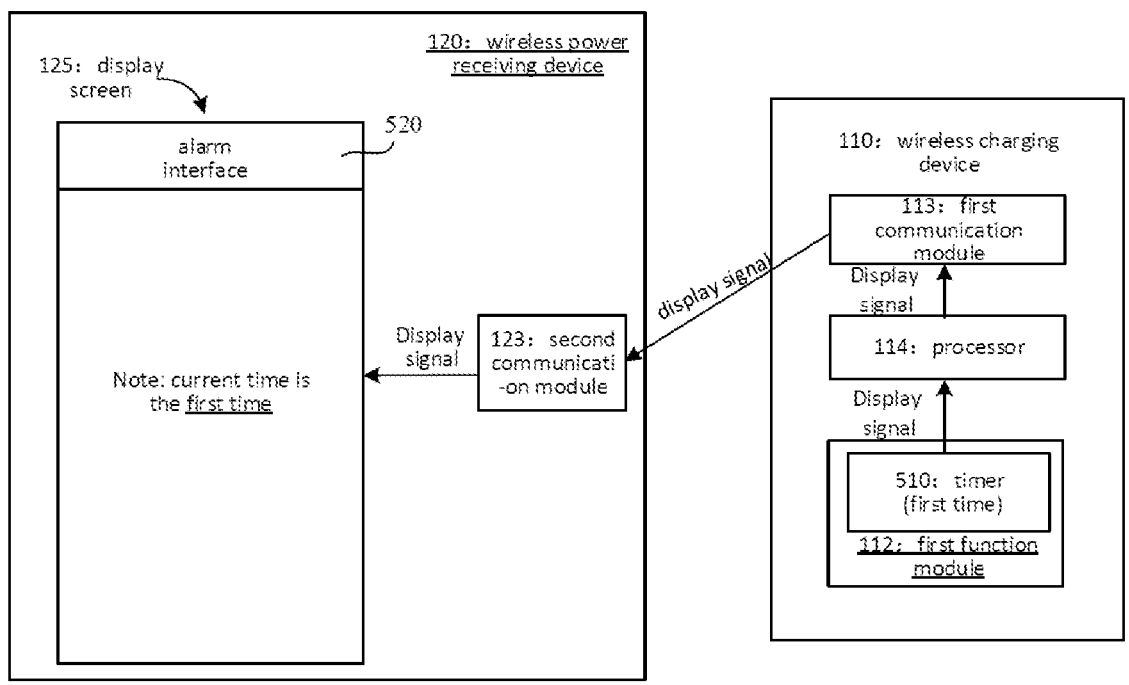
FIG. 5 is a diagram of an interaction process of determining display content of a display screen of a wireless power receiving device according to a first function module according to an exemplary embodiment.

For example, referring to FIG. 5, the wireless charging device 110 includes a timer 510. The timer 510 is set with a first time. When the clock time of the wireless charging device 110 reaches the first time, the timer 510 automatically generates a display signal, and the display signal is sent to the processor 114. After the processor 114 sends the display signal to the second communication module 123 through the first communication module 113, the display screen 125 in the wireless power receiving device 120 displays an alarm interface 520 according to the display signal received by the two communication modules 123.

In an embodiment, the first function module 112 receives a trigger signal, and after executing an operation corresponding to the trigger signal, generates an operation result and sends the operation result to the processor 114. The processor 114 generates a display signal according to the operation result, and sends the displays signal to the second communication module 123 through the first communication module 113.

In an embodiment, the wireless charging device 110 includes a network communication module. When the network communication module receives a notification message, the processor 114 generates a display signal according to the notification message, and sends the display signal to the second communication module 123 through the first communication module 113.

In an embodiment, the wireless charging device 110 further includes a memory, and an operating system and an application program are installed in the wireless charging device 110. A display interface corresponding to the operating system and the application program is displayed on the display screen 125 through communication between the first communication module 113 and the second communication module 123.

It should be noted that the power supplying or the wireless charging between the wireless charging module 111 and the wireless power receiving module 121 is independent from the communication between the first communication module 113 and the second communication module 123.

In the embodiments, by disposing the wireless charging module in the wireless charging device and the wireless power receiving module in the wireless power receiving device, and supplying power to the wireless power receiving module by the wireless charging module through the radio frequency transmitting antenna, a long-distance wireless charging between the wireless charging device and the wireless power receiving device is realized, so that the first function module of the wireless power receiving device is disposed in the wireless charging device, and an interaction between the first function module and the second function module is realized through the communication module, which improves the flexibility of the wireless power receiving device when being used.

In an embodiment, the first communication module 113 and the second communication module 123 may communicate with each other by means of an Ultra Wideband (UWB) carrierless communication. In an embodiment, the first communication module 113 and the second communication module may communicate with each other via a wireless network. The embodiment of the present disclosure is not limited thereto.

Figure 6:
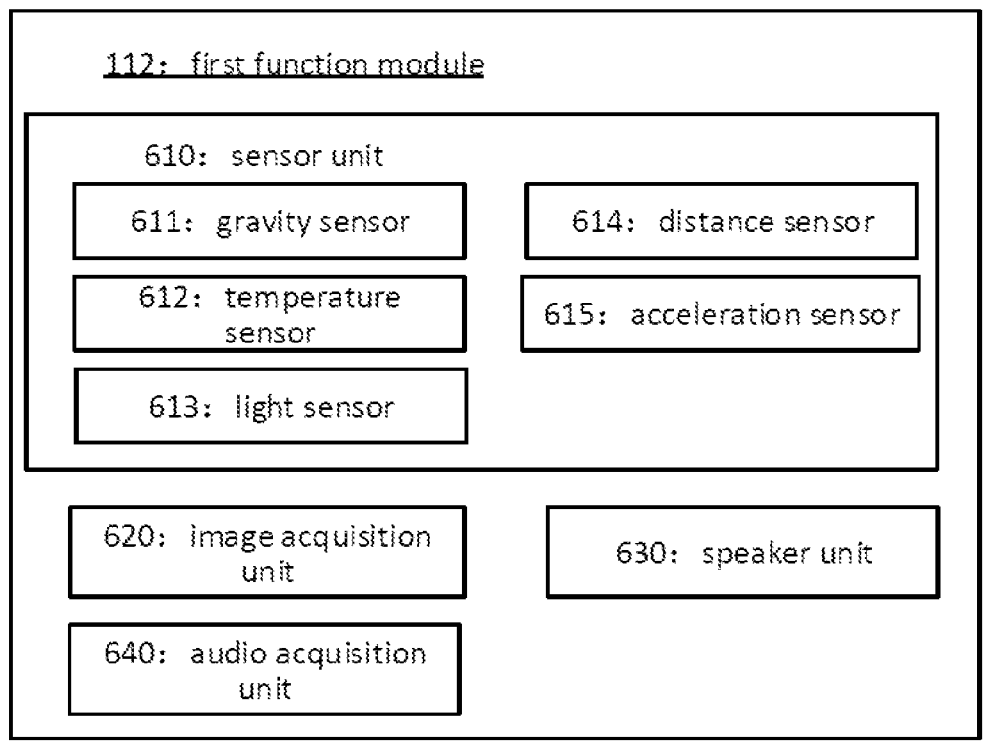
FIG. 6 is a schematic diagram of function units in a first function module according to an exemplary embodiment.

In an embodiment, referring to FIG. 6, the first function module 112 includes at least one of a sensor unit 610, an image acquisition unit 620, a speaker unit 630, or an audio acquisition unit 640. When the first function module 112 includes the sensor unit 610, the sensor unit includes at least one of a gravity sensor 611, a temperature sensor 612, a light sensor 613, a distance sensor 614, or an acceleration sensor 615.

It is to be noted that the function units included in the first function module 112 are only illustrative examples. The first function module 112 may further include other function units. The function units in a terminal may also be implemented in the above first function module 112. The embodiment of the present disclosure is not limited thereto.

In an embodiment, when the first function module 112 includes the image acquisition unit 620, the image acquisition unit 620 is configured to acquire an image and send the acquired target image to the processor 114. The processor 114 is configured to generate a corresponding display signal according to the target image, and send the display signal to the second communication module 123 through the first communication module 113. The display screen 125 is configured to display the target image according to the display signal received by the second communication module 123.

Figure 7:
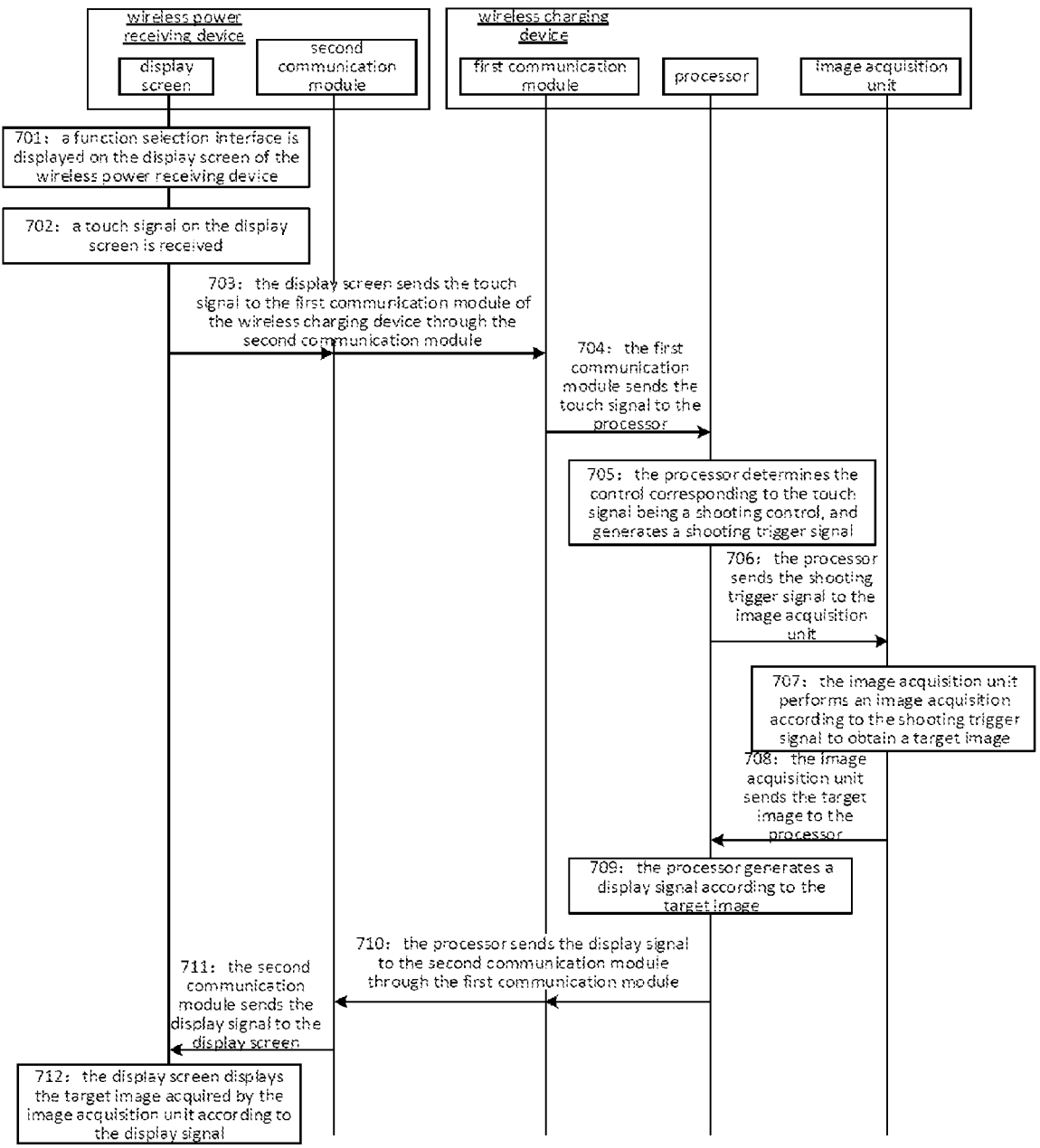
FIG. 7 is a flowchart of an image acquiring method according to an exemplary embodiment.

FIG. 7 is a flowchart of an image acquisition method according to an exemplary embodiment. By taking that the method is applied to the wireless charging system shown in FIG. 1 and the first function module 112 includes the image acquisition unit 620 as an example, the method includes the following steps.

At step 701, a function selection interface is displayed on a display screen of the wireless power receiving device.

In an embodiment, the wireless charging device further includes a memory, and an operating system and an application are installed in the memory. In an embodiment, the function selection interface may be a display interface provided by the operating system, or may be a display interface provided by the application. In an embodiment, the application comprises at least one of an instant messaging application, a financial application, a multimedia application, or a game application. In an embodiment, the function selection interface is a display interface provided by the instant messaging application, and the function selection interface includes a shooting control corresponding to a shooting function.

At step 702, a touch signal on the display screen is received.

In an embodiment, the touch signal is a signal corresponding to a touch operation acting on the shooting control. In an embodiment, the touch signal includes a touch coordinate on the display screen corresponding to the touch operation.

At step 703, the display screen sends the touch signal to the first communication module of the wireless charging device through the second communication module.

In an embodiment, the second communication module sends the touch signal to the first communication module by means of the UWB communication.

At step 704, the first communication module sends the touch signal to the processor.

At step 705, the processor determines the control corresponding to the touch signal being a shooting control, and generates a shooting trigger signal.

In an embodiment, the processor determines, according to the touch coordinate corresponding to the touch signal and an interface content displayed on the current display screen, that the control corresponding to the touch signal is the shooting control.

At step 706, the processor sends the shooting trigger signal to the image acquisition unit.

In an embodiment, after determining the control corresponding to the touch signal is the shooting control according to the touch signal, the processor determines the first function module corresponding to the shooting control being the image acquisition unit, and sends the shooting trigger signal to the image acquisition unit.

At step 707, the image acquisition unit performs an image acquisition according to the shooting trigger signal to obtain a target image.

In an embodiment, the target image may be an image, or may be a video stream composed of multiple images.

At step 708, the image acquisition unit sends the target image to the processor.

In an embodiment, the processor combines the target image and other content to be displayed on the display screen to determine how the target image is displayed on the display screen. In an embodiment, the processor includes a central processing unit (CPU) and a graphics processing unit (GPU). The CPU calculates the display content of the display screen, and the GPU displays the display content of the display screen.

At step 709, the processor generates a display signal according to the target image.

In an embodiment, the display signal includes a signal obtained by converting the display content of the display screen.

At step 710, the processor sends the display signal to the second communication module through the first communication module.

At step 711, the second communication module sends the display signal to the display screen.

At step 712, the display screen displays the target image acquired by the image acquisition unit according to the display signal.

In an embodiment, the display content of the display screen includes the target image. In an embodiment, the display content of the display screen further includes other content, such as a shooting parameter, a shooting setting column, and the like.

It should be noted that the image acquisition method shown in FIG. 7 is only described by taking the first function module 112 includes the image acquisition unit 620 as an example. When the first function module 112 includes other function units, the image acquisition unit 620 may also be implemented as other function units, and the function implemented by the image acquisition unit 620 is correspondingly changed according to the actual function unit in the first functional module 112.

In an embodiment, the image acquisition unit 620 may be implemented as a camera, or may be implemented as a camera module composed of multiple cameras.

Figure 8:
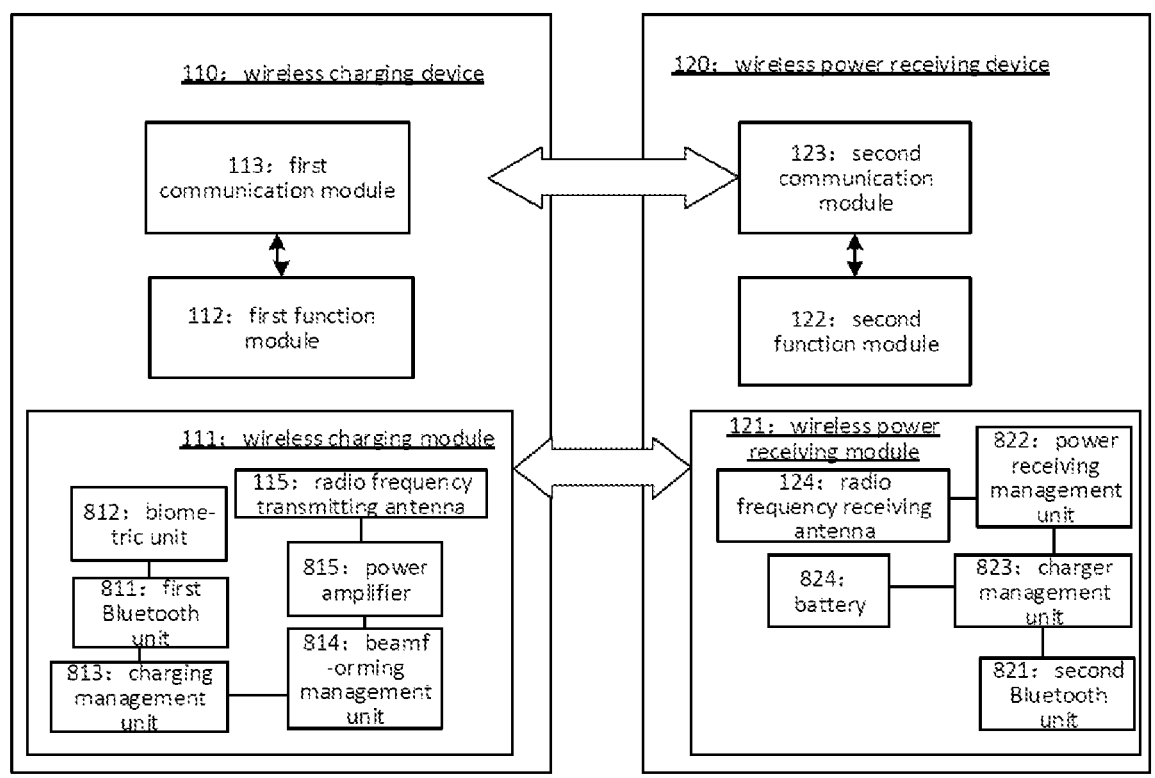
FIG. 8 is a block diagram of a wireless charging device and a wireless power receiving device in a wireless charging system according to an exemplary embodiment.

In an embodiment, as shown in FIG. 8, the wireless charging module 111 further includes a first Bluetooth unit 811, a biometric unit 812, a charging management unit 813, and a beamforming management unit 814 and a power amplifier 815. The wireless power receiving module 121 further includes a second Bluetooth unit 821 and a power receiving management unit 822.

The biometric unit 812 is configured to determine the distance between the wireless charging device 110 and a living body. In an embodiment, the biometric unit 812 determines the distance between the wireless charging device 110 and the living body (e.g., a human body) by detecting ambient temperature, or the biometric unit 812 determines the distance between the wireless charging device and the living body by sphygmus detection.

In an embodiment, the biometric unit 812 sends a recognition result to the first Bluetooth unit 811. In an embodiment, the first Bluetooth unit 811 and the second Bluetooth unit 821 communicate with each other through a Bluetooth Low Energy (BLE) technology. In an embodiment, the distance between the wireless charging device 110 and the wireless power receiving device 120 and that between the wireless power receiving device 120 and the living body are determined according to the first Bluetooth unit 811 and the second Bluetooth unit 821, thereby determining the power of the power supply between the wireless charging module 111 and the wireless power receiving module 121. The power of the power supply is set in a state in which the power supply efficiency of the wireless charging module 111 to the wireless power receiving module 121 is high, and the power of the power supply has the lowest effect (e.g., radiation effect) on the living body.

In an embodiment, the charging management unit 813 is configured to control power of the power supply according to the recognition result of the distance by the first Bluetooth unit 811, the beamforming management unit 814 is configured to perform bandwidth adjustment on the radio frequency signal, and the power amplifier 815 is configured to perform power amplification processing on the radio frequency signal.

In an embodiment, the power receiving management unit 822 is configured to manage the radio frequency signal received by the radio frequency receiving antenna 124.

In an embodiment, the wireless power receiving module 121 further includes a charger management unit 823 and a battery 824. The charger management unit 823 is configured to manage the charging process of the battery 824. The wireless charging module 111 is further configured to wirelessly charge the battery 824 of the wireless power receiving device 120 through the radio frequency transmitting antenna 115. The wireless power receiving module 121 is configured to receive wireless charging of the battery 824 by the wireless charging device 110 through the radio frequency receiving antenna 124, and to supply power to the wireless power receiving device 120 through the battery 824.

Figure 9:
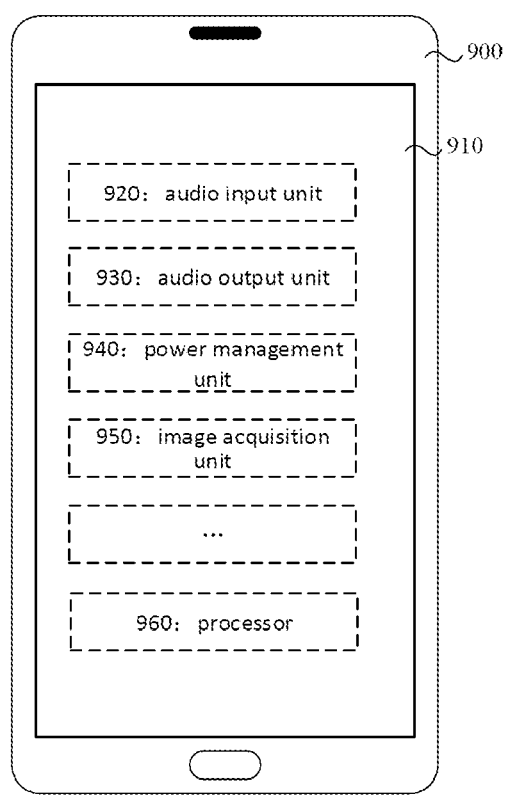
FIG. 9 is a schematic diagram of a distribution of function modules in a terminal in related art.

In the related art, a mobile terminal 900, such as mobile phone, tablet and the like, is configured with a display 910, an audio input unit 920, an audio output unit 930, a power management unit 940, an image acquisition unit 950, and the like, and the terminal 900 further includes a processor 960. The above function units are integrated in the mobile terminal, and thus the load in the mobile terminal is increased. As shown in FIG. 9, the terminal 900 is an integral mobile device, and the above function units are integrated in the terminal 900.

In embodiments of the present disclosure, the wireless charging device 110 may be implemented as a first wearable device, and the wireless power receiving device 120 may be implemented as a handheld device or a second wearable device.

In an embodiment, when the wireless charging device 110 is implemented as the first wearable device and the wireless power receiving device 120 is implemented as the second wearable device, a manner in which the wireless charging device 110 is worn comprises a manner in which the wireless charging device 110 is worn around a wrist, and a manner in which the wireless power receiving device 120 is worn comprises a manner in which the wireless power receiving device 120 is worn in a form of intelligent glasses.

Figure 10:
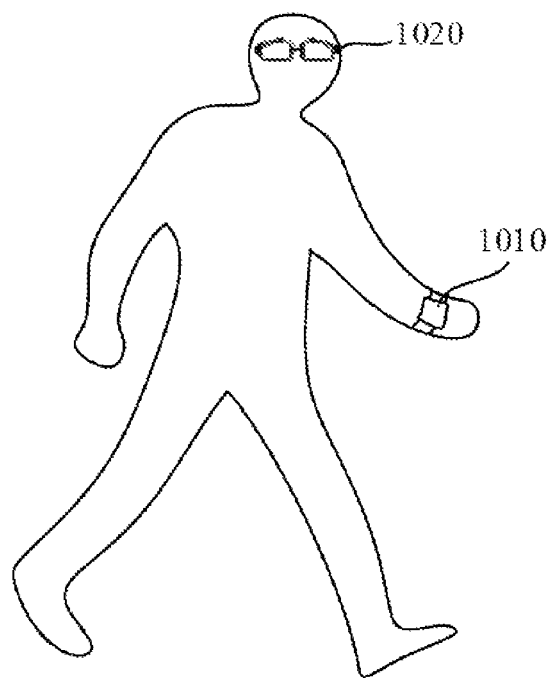
FIG. 10 is a schematic diagram of a wearing mode when a wireless charging device and a wireless power receiving device are worn in the form of a wearable device according to an exemplary embodiment.

For example, referring to FIG. 10, a wireless charging device 1010 is worn at the wrist of a user. The wireless charging device 1010 is worn at the wrist of the user in the form of a smart watch, and the user's face is worn with a wireless power receiving device 1020. The wireless power receiving device 1020 is worn in front of the user's eyes in the form of smart glasses. In an embodiment, a wireless charging or wireless powering is performed between the wireless charging device 1010 and the wireless power receiving device 1020 by using an RF technology, and the wireless charging device 1010 and the wireless power receiving device 1020 communicate with each other by using UWB technology, so that the wireless power receiving device 1020 displays the display content sent by the processor in the wireless charging device 1010 through the lens.

In the wireless charging system according to the present disclosure, by disposing the wireless charging module in the wireless charging device and the wireless power receiving module in the wireless power receiving device, and supplying power to the wireless power receiving module by the wireless charging module through the radio frequency transmitting antenna, a long-distance wireless charging between the wireless charging device and the wireless power receiving device is realized, so that the first function module of the wireless power receiving device is disposed in the wireless charging device, and an interaction between the first function module and the second function module is realized through the communication module, which improves the flexibility of the wireless power receiving device when being used.

The wireless charging system provided by the present disclosure is flexible in design, meets the linking between the terminal and the artificial intelligence field according to the development of the artificial intelligence field, and can meet the needs of users in a specific field, such as a game mobile phone with extreme performance, a terminal with a longer battery life, a terminal with faster charging speed, and the like, and the wireless charging device and the wireless power receiving device are easy to carry and flexible to use, which enhances the user's interaction experience in the aspect of display and touch.

It should be noted that, in the foregoing embodiment, as an example, the wireless charging device 110 and the wireless power receiving device 120 are implemented as a wireless charging system. In actual operation, the wireless charging device 110 and the wireless power receiving device 120 in the wireless charging system may also be implemented as two separate mobile terminals.

The above-mentioned serial numbers of the embodiments of the present disclosure are merely for the description, and do not represent the advantages and disadvantages of the embodiments.

A person skilled in the art may understand that all or part of the steps of implementing the above embodiments may be executed by hardware, or may be executed by a program instructing related hardware. The program may be stored in a computer readable storage medium. The storage medium mentioned may be a read only memory, a magnetic disk, an optical disk or the like.

The above description is only the exemplary embodiments of the present disclosure, and is not intended to limit the present disclosure. Any modifications, equivalent substitutions, improvements, etc., which are within the spirit and principles of the present disclosure, should be included in the protection of the present disclosure.

What is claimed is:

1. A wireless charging system, comprising:
a wireless charging device and a wireless power receiving device, wherein:
the wireless charging device comprises a wireless charging module, a first function module, a processor, a biometric unit, a first Bluetooth unit, and a first communication module, the wireless charging module comprises a radio frequency transmitting antenna, and the biometric unit is configured to determine a distance between the wireless charging device and a living body;
the wireless power receiving device comprises a wireless power receiving module, a second function module, a second Bluetooth unit, and a second communication module, and the wireless power receiving module comprises a radio frequency receiving antenna;
the processor is configured to determine a distance between the wireless charging device and the wireless power receiving device according to the first Bluetooth unit and the second Bluetooth unit, to adjust a radio frequency power transmitted by the radio frequency transmitting antenna of the wireless charging device;

the wireless charging module is configured to supply power to the wireless power receiving device through the radio frequency transmitting antenna, and the wireless power receiving module is configured to receive the power supplied by the wireless charging device through the radio frequency receiving antenna;

the first function module is configured to implement a first function subset in a function set, and the second function module is configured to implement a second function subset in the function set; and the first function module and the second function module communicate with each other through the first communication module and the second communication module.

2. The system according to claim 1, wherein the function set comprises at least one of a sensor function, a display function, an image acquisition function, an audio play function, an audio acquisition function, a telephone communication function, or a network function.

3. The system according to claim 2, wherein
the first function module is configured to receive a trigger signal sent by the processor, and execute an operation corresponding to the trigger signal.

4. The system according to claim 3, wherein the second function module comprises a display screen, and the display screen is configured to implement the display function; and the processor is configured to send a display signal to the second communication module through the first communication module, and the display screen is configured to display a corresponding content according to the display signal received by the second communication module.

5. The system according to claim 4, wherein the display screen is a touch display screen including a touch function;

the display screen is further configured to receive a touch signal;

the display screen is further configured to send the touch signal to the first communication module through the second communication module; and the processor is configured to generate the trigger signal according to the touch signal received by the first communication module, and send the trigger signal to the first function module.

6. The system according to claim 4, wherein
the first function module is configured to receive the trigger signal, generate an operation result after executing the operation corresponding to the trigger signal and send the operation result to the processor; and the processor is configured to generate the display signal according to the operation result, and send the display signal to the second communication module through the first communication module.

7. The system according to claim 4, wherein the first function module comprises at least one of a sensor unit, an image acquisition unit, a speaker unit, an audio acquisition unit, or a network communication unit; and wherein the sensor unit is configured to implement the sensor function, the image acquisition unit is configured to implement the image acquisition function, the speaker unit is configured to implement the audio play function, the audio acquisition unit is configured to implement the audio acquisition function, and the network communication unit is configured to implement the network function.

8. The system according to claim 7, wherein when the first function module comprises the sensor unit, the sensor unit comprises at least one of a gravity sensor, a temperature sensor, a light sensor, a distance sensor, or an acceleration sensor.

9. The system according to claim 7, wherein
when the first function module comprises the image acquisition unit, the image acquisition unit is configured to acquire an image, and send the acquired image as a target image to the processor;

the processor is configured to generate a corresponding display signal according to the target image, and send the corresponding display signal to the second communication module through the first communication module; and the display screen is configured to display the target image according to the corresponding display signal received through the second communication module.

10. The system according to claim 1, wherein the wireless power receiving module further comprises a battery;

the wireless charging module is further configured to wirelessly charge the battery of the wireless power receiving device through the radio frequency transmitting antenna; and the battery of the wireless power receiving module is configured to be wirelessly charged by the wireless charging device through the radio frequency receiving antenna, and supply power to the wireless power receiving device.

11. A wireless charging device, comprising:
a wireless charging module, a first function module, a processor, a biometric unit, a first Bluetooth unit, and a first communication module, wherein:

the wireless charging module comprises a radio frequency transmitting antenna;

the biometric unit is configured to determine a distance between the wireless charging device and a living body;

the processor is configured to determine a distance between the wireless charging device and a wireless power receiving device according to the first Bluetooth unit and a second Bluetooth unit of the wireless power receiving device, to adjust a radio frequency power transmitted by the radio frequency transmitting antenna of the wireless charging device;

the wireless charging module is configured to supply power to the wireless power receiving device through the radio frequency transmitting antenna;

the first function module is configured to implement a first function subset in a function set; and the first function module is configured to communicate with a second function module in the wireless power receiving devices through the first communication module.

12. The device according to claim 11, wherein the function set comprises at least one of a sensor function, a display function, an image acquisition function, an audio play function, an audio acquisition function, a telephone communication function, or a network function.

13. The device according to claim 12, wherein
the first function module is configured to receive a trigger signal sent by the processor, and execute an operation corresponding to the trigger signal.

14. The device according to claim 13, wherein
the first function module is further configured to receive the trigger signal, generate an operation result after executing the operation corresponding to the trigger signal and send the operation result to the processor; and the processor is configured to generate the display signal according to the operation result, and send the display signal to the wireless power receiving device through the first communication module.

15. The device according to claim 13, wherein the first function module comprises at least one of a sensor unit, an image acquisition unit, a speaker unit, an audio acquisition unit, or a network communication unit; and wherein the sensor unit is configured to implement the sensor function, the image acquisition unit is configured to implement the image acquisition function, the speaker unit is configured to implement the audio play function, the audio acquisition unit is configured to implement the audio acquisition function, and the network communication unit is configured to implement the network function.

16. The device according to claim 15, wherein when the first function module comprises the image acquisition unit, the image acquisition unit is configured to acquire an image, and send the acquired image as a target image to the processor;

the processor is configured to generate a corresponding display signal according to the target image, and send the corresponding display signal to the wireless power receiving device through the first communication module; and the corresponding display signal is configured to control a display screen of the wireless power receiving device to display the target image.

17. A wireless power receiving device, comprising:

a wireless power receiving module, a second function module, a second Bluetooth unit, and a second communication module, wherein:

the wireless power receiving module comprises a radio frequency receiving antenna;

the wireless power receiving module is configured to receive power supplied by a wireless charging device through the radio frequency receiving antenna;

the second function module is configured to implement a second function subset in a function set; and the second function module is configured to communicate with a first communication module of the wireless charging device through the second communication module, wherein the wireless charging device comprises a wireless charging module, a first function module, a processor, a biometric unit, a first Bluetooth unit, and the first communication module, the wireless charging module comprises a radio frequency transmitting antenna, and the biometric unit is configured to determine a distance between the wireless charging device and a living body;

the processor is configured to determine a distance between the wireless charging device and the wireless power receiving device according to the first Bluetooth unit and the second Bluetooth unit, to adjust a radio frequency power transmitted by the radio frequency transmitting antenna of the wireless charging device;

the wireless charging module is configured to supply power to the wireless power receiving device through the radio frequency transmitting antenna;

the first function module is configured to implement a first function subset in the function set; and the first function module and the second function module communicate with each other through the first communication module and the second communication module.

18. The device according to claim 17, wherein the function set comprises at least one of a sensor function, a display function, an image acquisition function, an audio play function, an audio acquisition function, a telephone communication function, or a network function.

19. The device according to claim 17, wherein the second function module comprises a display screen, and the display screen is configured to implement a display function;

the display screen is configured to display a corresponding content according to a display signal received by the second communication module.

20. The device according to claim 19, wherein the display screen is a touch display screen including a touch function;

the display screen is further configured to receive a touch signal;

the display screen is further configured to send the touch signal to the first communication module through the second communication module; and the wireless charging device is configured to generate the trigger signal according to the touch signal received by the first communication module, and send the trigger signal to the first function module.

* * * * *